United States Patent
Hayashi

(10) Patent No.: US 7,353,096 B2
(45) Date of Patent: Apr. 1, 2008

(54) DIAGNOSIS MONITORING DEVICE FOR YAW RATE SENSOR

(75) Inventor: Noritaka Hayashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 244 days.

(21) Appl. No.: 11/192,176

(22) Filed: Jul. 29, 2005

(65) Prior Publication Data

US 2006/0025910 A1 Feb. 2, 2006

(30) Foreign Application Priority Data

Aug. 2, 2004 (JP) ............................. 2004-225999

(51) Int. Cl.
*B60T 8/32* (2006.01)
(52) U.S. Cl. ......................... 701/34; 303/139
(58) Field of Classification Search ................... 701/34, 701/70, 29, 31, 36, 41, 72, 74, 92, 76, 82; 303/139, 140, 146, 147, 148
See application file for complete search history.

(56) References Cited

U.S. PATENT DOCUMENTS

| 5,219,212 | A | * | 6/1993 | Shimada et al. ............ 303/148 |
| 5,457,632 | A | * | 10/1995 | Tagawa et al. ............. 701/43 |
| 5,862,503 | A | * | 1/1999 | Eckert et al. .............. 701/78 |
| 5,964,511 | A |   | 10/1999 | Miyazaki .................. 303/191 |
| 5,964,819 | A | * | 10/1999 | Naito ..................... 701/72 |
| 6,074,020 | A |   | 6/2000 | Takahashi et al. |
| 6,208,927 | B1 |   | 3/2001 | Mine et al. |
| 6,219,609 | B1 |   | 4/2001 | Matsuno et al. |
| 6,280,007 | B2 |   | 8/2001 | Matsuno |
| 6,286,915 | B2 |   | 9/2001 | Matsuno |
| 6,366,833 | B1 | * | 4/2002 | Fukuyama ................. 701/1 |
| 6,401,023 | B1 |   | 6/2002 | Takahashi |
| 6,415,215 | B1 | * | 7/2002 | Nishizaki et al. ......... 701/70 |
| 6,526,804 | B2 |   | 3/2003 | Takahashi |
| 6,543,278 | B1 |   | 4/2003 | Kogure |
| 6,567,748 | B2 |   | 5/2003 | Matsuno |
| 6,634,451 | B2 |   | 10/2003 | Sakakiyama |
| 6,675,096 | B2 |   | 1/2004 | Matsuura |
| 6,725,145 | B1 |   | 4/2004 | Takahashi |
| 2001/0044688 | A1 | * | 11/2001 | Okita et al. ............. 701/92 |
| 2005/0012501 | A1 |   | 1/2005 | Hiroshi et al. |

FOREIGN PATENT DOCUMENTS

| JP | 09-002240 | 1/1997 |
| JP | 2003-104139 | 4/2003 |

* cited by examiner

*Primary Examiner*—Dalena Tran
(74) *Attorney, Agent, or Firm*—Smith, Gambrell & Russell, LLP

(57) ABSTRACT

A yaw rate sensor failure diagnosing device judges whether the yaw rate sensor is failure or not. In particular, when the vehicle is in the steady turn state, the failure is judged by comparing a yaw rate value from the yaw rate sensor with a yaw rate value calculated on the basis of the value of the tire force acting on each wheel. Furthermore, the vehicle is in the non-steady turn state, the failure is judged by comparing a yaw moment value calculated from the yaw rate value from the yaw rate sensor with a yaw moment value calculated on the basis of the value of the tire force acting on each wheel.

6 Claims, 3 Drawing Sheets

DIAGNOSIS MONITORING DEVICE FOR YAW RATE SENSOR

CROSS REFERENCE TO RELATED APPLICATIONS

The disclosure of Japanese Application No. 2004-225999 filed on Aug. 2, 2004 including the specification, drawing and abstract is incorporated herein by reference in its entirety.

BACKGROUND OF THE INVENTION

1. Field of the Invention

The present invention relates to a yaw rate sensor failure diagnosing device for judging abnormality (or failure) of a yaw rate sensor with precision.

2. Description of Related Art

Various vehicle behavior control operations such as automatic braking control, driving force distributing control, etc. have been recently carried out on vehicles in order to enhance driveability and turning performance. In these control operations, a yaw rate sensor for detecting a yaw rate is mounted in order to know the present behavior of the vehicle. Therefore, when abnormality occurs in the yaw rate sensor, the vehicle behavior control itself is abnormal, and thus it has been desired to establish failure diagnosis for yaw rate sensors.

For example, Japanese unexamined Patent publication JP-A-2003-104139 discloses a technique of carrying out such a sensor failure diagnosis. According to this technique, with respect to sensor values detected when a vehicle is in a vehicle motion state that the sensor value is equal to a zero point and when the vehicle is in a vehicle motion state that the sensor value is equal to a preset reference value, the displacement of the sensor value from the zero point or the reference value is observed, and it is judged on this observation whether the sensor is abnormal or not.

In the failure diagnosis disclosed in the above publication, however, it is possible to judge abnormality only in the vehicle motion state that the sensor value is equal to the zero point or the preset reference value, and thus it is impossible to judge abnormality by detecting continuously ever-changing parameters. Accordingly, there is a problem that it is difficult to judge abnormality for a long time in some vehicle travel states and thus the abnormality judgment is remarkably late.

Particularly with respect to a control operation using a yaw rate sensor, for example, a vehicle behavior control operation of controlling braking force to induce a yaw moment to the vehicle, the output from the yaw rate sensor is directly connected to the control value, and thus it is required to detect an accurate value on a real-time basis even though the vehicle is in any vehicle motion state. Accordingly, when abnormality occurs in the yaw rate sensor, it is required to immediately detect abnormality and correct the control even though the vehicle is in any vehicle motion state.

SUMMARY OF THE INVENTION

The invention has been implemented in view of the foregoing situation, and has an object to provide a yaw rate sensor failure diagnosing device that can continuously monitor a vehicle motion state and immediately and accurately detect abnormality of a yaw rate sensor even though the vehicle is in any vehicle motion state.

According to the invention, there is provided a yaw rate sensor failure detecting device comprising: a yaw rate sensor for detecting a yaw rate; a tire force detecting unit for detecting tire force acting on each wheel; a vehicle motion state judging unit for judging a steady turn state and a non-steady turn state on the basis of the tire force acting on each wheel; a yaw rate comparing and abnormality judging unit for comparing a yaw rate value from the yaw rate sensor with a yaw rate value calculated on the basis of the value of the tire force acting on each wheel when the vehicle is in the steady turn state and judging abnormality of the yaw rate sensor; and a yaw moment comparing and abnormality judging unit for comparing a yaw moment value calculated from the yaw rate value from the yaw rate sensor with a yaw moment value calculated on the basis of the value of the tire force acting on each wheel when the vehicle is in the non-steady turn state and judging abnormality of the yaw rate sensor.

According to the yaw rate sensor failure diagnosing device of the invention, even through the vehicle is in any vehicle motion state, the vehicle motion state can be continuously monitored and the abnormality of the yaw rate sensor can be immediately and accurately detected.

DETAILED DESCRIPTION OF PREFERRED EMBODIMENT

A preferred embodiment according to the invention will be described hereunder with reference to the accompanying drawings.

Figure 1:
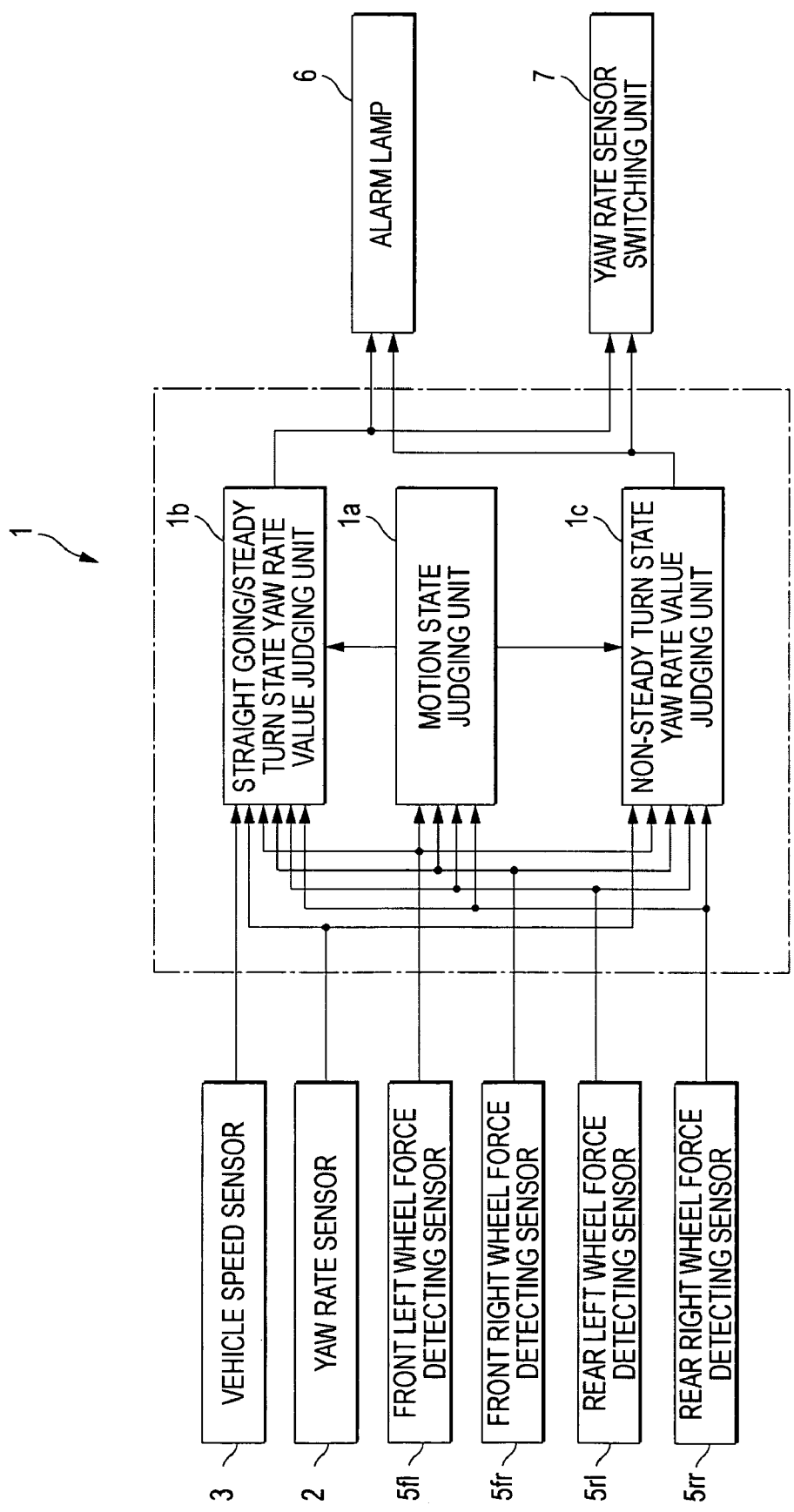
FIG. 1 is a functional block diagram showing a failure diagnosing device for a yaw rate sensor.
Figure 2:
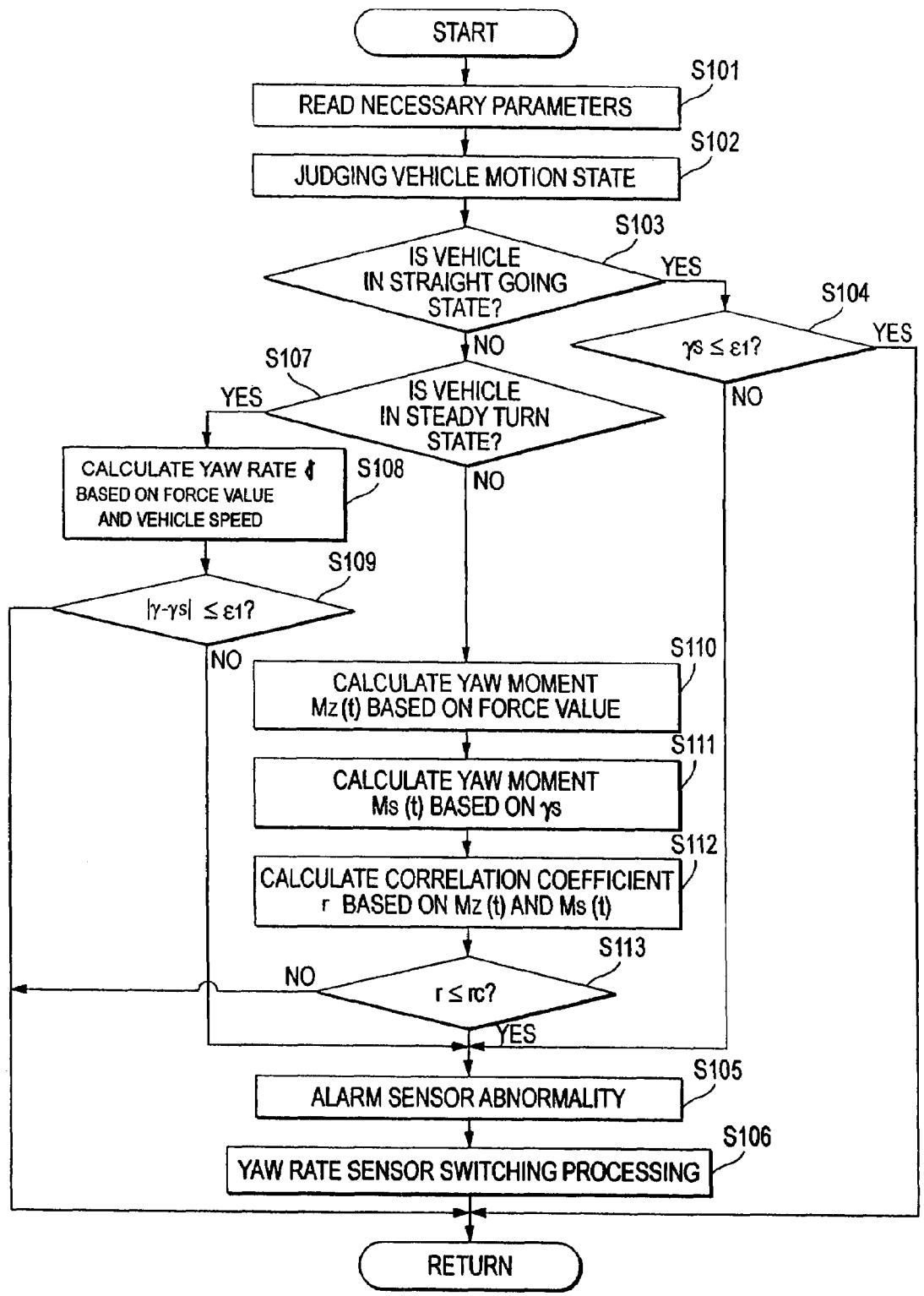
FIG. 2 is a flowchart showing a failure diagnosis program for a yaw rate sensor.
Figure 3:
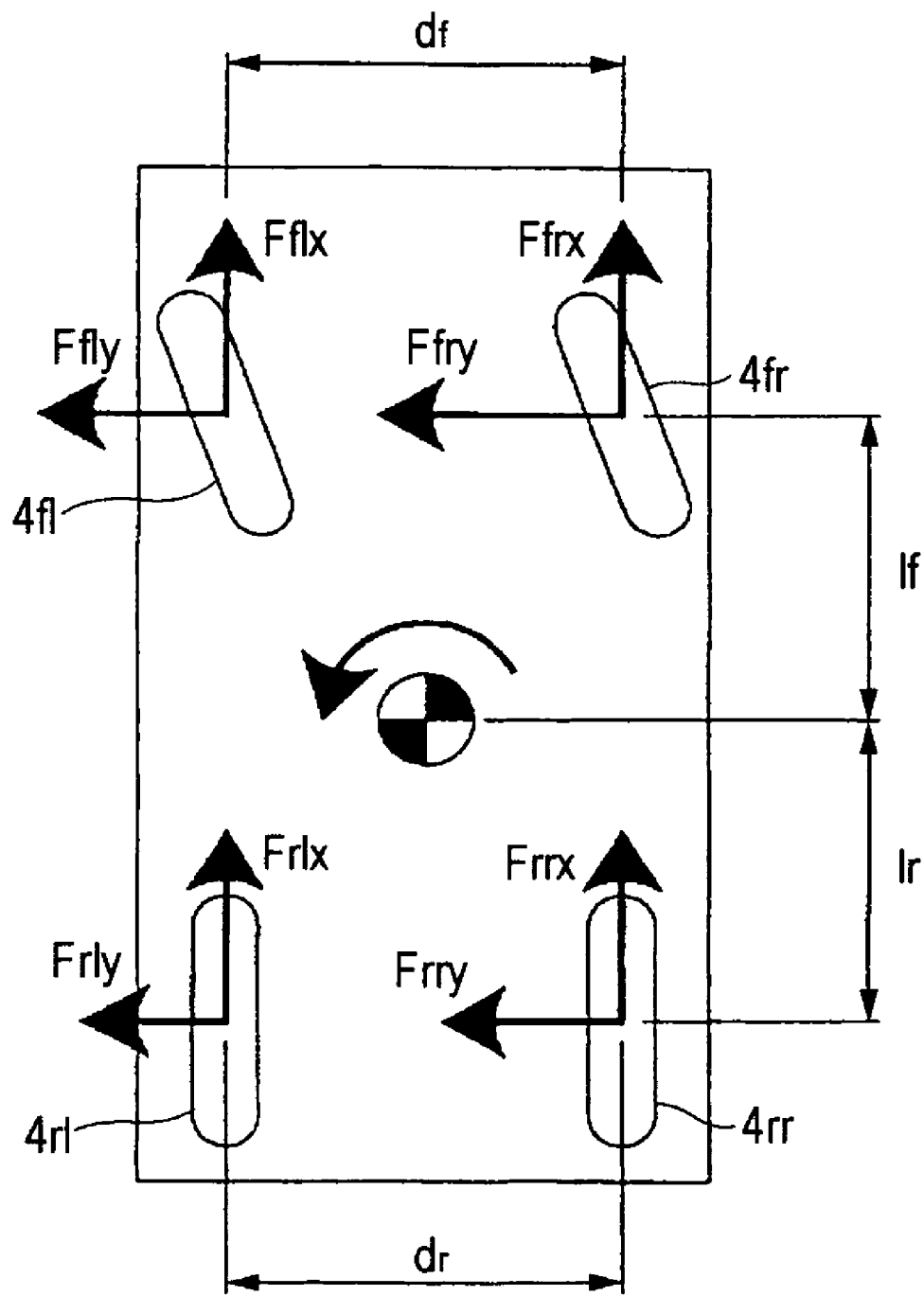
FIG. 3 is a diagram showing force acting on each wheel.

FIGS. 1 to 3 show an embodiment of the invention, wherein FIG. 1 is a functional block diagram of a failure diagnosing device for a yaw rate sensor, FIG. 2 is a flowchart showing a failure diagnosis program for a yaw rate sensor, and FIG. 3 is a diagram showing force acting on each wheel.

In FIG. 1, reference numeral 1 represents a yaw rate sensor failure diagnosing device for judging abnormality of a yaw rate sensor 2 which is mounted in a vehicle, and the yaw rate sensor failure diagnosing device 1 mainly comprises a motion state judging unit 1a, a straight-going/steady turn state yaw rate value judging unit 1b and a non-steady turn state yaw rate value judging unit 1c.

A yaw rate γs is input from the yaw rate sensor 2 to the yaw rate sensor failure diagnosing device 1, and also a vehicle speed V is input from a vehicle speed sensor 3 to the yaw rate sensor failure diagnosing device 1.

To the yaw rate sensor failure diagnosing device 1 are connected tire force detecting sensors 5fl, 5fr, 5rl, 5rr embedded in axle housings (not shown) of four wheels 4fl, 4fr, 4rl, 4rr (see FIG. 3). These tire force detecting sensors 5fl, 5fr, 5rl, 5rr serve as tire force detecting units, and correspond to the sensors disclosed in JP-A-9-2240. Each tire force detecting sensor detects the respective forces acting in the longitudinal direction (hereinafter referred to as "x-direction"), the lateral direction (hereinafter referred to as "y-direction") and the vertical direction (hereinafter referred to as "z-direction") on each wheel on the basis of a displacement amount occurring in each axle housing. Specifically, forces Fflx, Ffly and Fflz acting in the longitudinal direction, the lateral direction and the vertical direction of the front left wheel are input from the front left wheel force detecting sensor 5fl, the tire forces Ffrx, Ffry and Ffrz acting in the longitudinal direction, the lateral direction and the vertical direction of the front right wheel are input from the front right wheel force detecting sensor 5fr, the tire forces Frlx, Frly and Frlz acting in the longitudinal direction, the lateral direction and the vertical direction of the rear left wheel are input from the rear left wheel force detecting sensor 5rl, and tire forces Frrx, Frry and Frrz acting in the longitudinal direction, the lateral direction and the vertical direction of the rear right wheel are input from the rear right wheel force detecting sensor 5rr.

The yaw rate sensor failure diagnosing device 1 judges abnormality of a yaw rate sensor 2 on the basis of each input signal described above, and when it is judged that abnormally occurs in the yaw rate sensor 2, the device 1 outputs a signal to an alarm lamp 6 (for example, an alarm lamp provided to a meter panel (not shown)) to turn on the alarm lamp 6.

Furthermore, when it is judged that abnormality occurs in the yaw rate sensor 2, the yaw rate sensor failure diagnosing device 1 outputs a signal to a yaw rate sensor switching portion 7 to output an alternative yaw rate value estimated by an element other than the yaw rate sensor 2. If this alternative value of the yaw rate value is calculated on the basis of the values from the tire force detecting sensors 5fl, 5fr, 5rl, 5rr, for example, the calculation is carried out from the following equation (2).

As shown in FIG. 3, when the length from the center-of-gravity position of the vehicle to the front axle of the vehicle is represented by lf, the length from the center-of-gravity position to the rear axle is represented by lr, the tread of the front wheel is represented by df, the tread of the rear wheel is represented by dr, the yaw inertia moment is represented by I and the yaw rate is represented by γ, the moment Mz (t) occurring in the vehicle is represented by the following equation (1):

$$Mz(t)=I \cdot (d\gamma/dt)=lf(Ffly+Ffry)-lr \cdot (Frly+Frry)+(df/2) \cdot (Ffrx-Fflx)-(dr/2)\cdot(Frlx-Frrx) \quad (1)$$

Accordingly, $$\gamma = \int ((1f \cdot (Ffly+Ffry)-lr \cdot (Frly+Frry)+(df/2)\cdot(Ffrx-Fflx)-(dr/2)\cdot(Frlx-Frrx))/I)dt \quad (2)$$

When a lateral acceleration sensor is mounted in the vehicle, the yaw rate γ can be estimated from the following equation (3) by using a lateral acceleration $(d^2y/dt^2)s$ detected by the lateral acceleration sensor and a vehicle speed V detected by the vehicle speed sensor 3.

$$\gamma=(d^2y/dt^2)s/V \quad (3)$$

The forces Ffly, Ffry, Frly and Frry acting in the lateral direction are input from the tire force detecting sensors 5fl, 5fr, 5rl and 5rr to the motion state judging unit 1a of the yaw rate sensor failure diagnosing device 1. From these tire forces Ffly, Ffry, Frly and Frry acting in the lateral direction, the following vehicle motion states (straight-going state, the steady turn state and the non-steady turn state) are identified. In the case of the straight going state and the steady turn state, the motion state judging unit 1a outputs a signal for making the straight going/steady turn state yaw rate value judging unit 1b carry out an abnormality judgment of the yaw rate sensor, and in the case of the non-steady turn state, the motion state judging unit 1a outputs a signal for making the non-steady state yaw rate value judging unit 1c carry out an abnormality judgment of the yaw rate sensor. That is, the motion state judging unit 1a is provided as a vehicle motion state judging unit. Here, the steady turn state indicates a state under which the vehicle turns along a steady circle during constant-speed running. The non-steady turn state indicates a state other than the straight going state and the steady circle turn state, and for example, it is a state under which the vehicle makes a steady-circle turn with acceleration or braking or a state under which the vehicle turns along a non-steady circle.

In the steady turn state, no yaw moment occurs in the vehicle, and no longitudinal force occurs in the vehicle. Furthermore, in the straight going state, no lateral force occurs in the vehicle. Therefore, the total of the lateral forces acting on the front left wheel and the front right wheel and the total of the lateral forces acting on the rear left wheel and the rear right wheel are regarded as zero, so that the above equation (1) is equal to the equation (4) and the following equation (5) or the equation (6) is satisfied.

$$Mz(t)=I \cdot (d\gamma/dt)=lf(Ffly+Ffry)-lr \cdot (Frly+Frry) \approx 0 \quad (4)$$

$$Ffly+Ffry \approx 0 \quad (5)$$

$$Frly+Frry \approx 0 \quad (6)$$

Summarizing the above,
(Straight Going State) . . . When the equation (4) is satisfied and the equation (5) is satisfied, or when the equation (4) is satisfied and the equation (6) is satisfied.
Specifically, in this embodiment, From the equation (4), $lf \cdot (Ffly+Ffry)-lr \cdot (Frly+Frry) \leq \epsilon$ (7)

From the equation (5), $Ffly+Ffry \leq \epsilon$ (8)

When the equations (7) and (8) are satisfied, the straight going state is identified. Here, ε is a value near to zero, and for example it is set to 0.005 deg/sec.
(Steady Turn State) . . . the equation (4) is satisfied in cases other than the straight going state
Specifically, in this embodiment, when the equation (7) is satisfied and the equation (8) is not satisfied, the steady turn state is judged.
(Non-steady Turn State) . . . in cases other than the (straight going state) and the (steady turn state), that is, when the equation (4) is not satisfied.
In this embodiment, when the above equation (7) is not satisfied, the steady turn state is judged.

The judgment of the straight going state may be made, not by using the equation (7), but on the basis of whether the equation (8) is satisfied or not.

The yaw rate γs is input from the yaw rate sensor 2 to the straight going/steady turn state yaw rate value judging unit 1b, the vehicle speed V is input from the vehicle speed sensor 3 to the judging unit 1b, and the tire forces Ffly, Fflz, Ffry, Ffrz, Frly, Frlz, Frry, Frrz acting in the lateral and vertical directions are input from the tire force detecting sensors 5fl, 5fr, 5rl, 5rr to the judging init 1b.

When the vehicle is in the straight going state, it is judged whether the absolute value |γs| of the yaw rate γs from the yaw rate sensor 2 is substantially equal to zero, that is, it is equal to a preset value ε1 (for example, 0.005 deg/sec) or less. In the case of |γs|≤ε1, it is judged that the yaw rate sensor 2 is normal, however, in the case of |γs|>ε1, it is judged that the yaw rate sensor 2 is abnormal.

When the vehicle is in the steady turn state, the yaw rate γ is calculated from the following equation (10) on the basis of the respective input signals V, Ffly, Fflz, Ffry, Ffrz, Frly, Frlz, Frry, Frrz, and compared with the yaw rate γs from the yaw rate sensor 2 to judge whether the yaw rate sensor 2 is normal or abnormal.

That is, the dynamic equation in the lateral direction of the vehicle is represented by the following equation (9) when the vehicle mass is represented by m and the lateral slip angle is represented by β:

$$m \cdot V \cdot ((d\beta/dt)+\gamma) = Ffly + Ffry + Frly + Frry \quad (9)$$

In the case of the steady turn state, (dβ/dt)=0, and considering that the vehicle mass m is regarded as the total of the forces in the vertical direction acting on the respective wheels, the yaw rate 7 is represented by the following equation (10):

$$\gamma = (1/V) \cdot (Ffly + Ffry + Frly + Frry)/(Fflz + Ffrz + Frlz + Frrz) \quad (10)$$

The yaw rate γs detected by the yaw rate sensor 2 is subtracted from the yaw rate γ calculated from the equation (10) (γ−γs), and it is judged whether the absolute value of the subtraction result is substantially equal to zero, that is, it is less than the preset value ε1 (for example, 0.005 deg/sec) or less. That is, in the case of |γ−γs|≦ε1, the yaw rate sensor 2 is judged as being normal, and in the case of |γ−γs|>ε1, the yaw rate sensor 2 is judged as being abnormal. When abnormality of the yaw rate sensor 2 is judged in the straight going/steady turn state yaw rate value judging unit 1b, signals are output to the alarm lamp 6 and the yaw rate sensor switching unit 7. That is, the straight going/steady turn state yaw rate value judging unit 1b is provided as the yaw rate comparing and abnormality judging unit.

To the non-steady turn state yaw rate value judging unit 1c are input the yaw rate γs from the yaw rate sensor 2, and the tire forces Fflx, Ffly, Ffrx, Ffry, Frlx, Frly, Frrx, Frry acting in the longitudinal and lateral directions from the tire force detecting sensors 5fl, 5fr, 5rl, 5rr.

On the basis of the values from the tire force detecting sensors 5fl, 5fr, 5rl, 5rr, the yaw moment Mz (t) acting on the vehicle is calculated from the equation (1), and the yaw moment Ms (t) acting on the vehicle is calculated from the following equation (11):

$$Ms(t) = I \cdot (d\gamma s/dt) \quad (11)$$

Mz(t) and Ms(t) thus calculated are made discrete, and the correlation coefficient r between Mz(t) and Ms(t) is calculated from the following equation (12) with the number of samples measured within some time period set to N (for example, 200 points). As the correlation coefficient r is higher (in this embodiment, 1.0 to rc:rc represents 0.8, for example), it is judged that there is a strong correlation, and thus the yaw rate sensor 2 is judged as being normal. As the correlation coefficient r is lower (rc or less), it is judged that there is no correlation, and thus the yaw rate sensor 2 is judged as being abnormal. When abnormality of the yaw rate sensor 2 is judged in the non-steady turn state yaw rate value judging unit 1c, the signals are output to the alarm lamp 6 and the yaw rate sensor switching unit 7. That is, the non-steady turn state yaw rate value judging unit 1c is provided as the yaw moment comparing and abnormality judging unit.

$$r = \left( \sum_{i=1}^{N} (Mz(t) - Mz(t)ave) \cdot (Ms(t) - Ms(t)ave) \right) / \quad (12)$$

-continued $$\left( \left( \sum_{i=1}^{N} (Mz(t) - Mz(t)ave)^2 \right)^{1/2} \cdot \left( \sum_{i=1}^{N} (Ms(t) - Ms(t)ave)^2 \right)^{1/2} \right)$$

Next, a yaw rate sensor failure diagnosis program executed in the yaw rate sensor failure diagnosing device 1 will be described with reference to the flowchart of FIG. 2.

First, in step (hereinafter abbreviated to "S") 101, necessary parameters, that is, the yaw rate γs, the vehicle speed V and the tire forces Fflx, Ffly, Fflz, Ffrx, Ffry, Ffrz, Frlx, Frly, Frlz, Frrx, Frry, Frrz acting in the longitudinal, lateral and vertical directions of each wheel are read in.

Next, the processing goes to step S102 to judge in the motion state judging unit 1a whether the present vehicle motion state is the straight going state, the steady turn state or the non-steady turn state as described above.

Subsequently, the processing goes to step S103 to judge on the basis of he judgment result of step S102 whether the vehicle is in the straight going state or not. If the vehicle is in the straight going state, the processing goes to step S104 to judge whether the absolute value |γs| of the yaw rate γ from the yaw rate sensor 2 is substantially equal to zero, that is, it is not more than the preset value ε1 (for example, 0.005 deg/sec). In the case of |γs|≦ε1, the yaw rate sensor 2 is regarded as being normal, and the progressing goes out of this program. In the case of |γs|>ε1, the yaw rate sensor 2 is judged as being abnormal, and the processing goes to step S105 to turn on the alarm lamp 6, thereby carrying out a sensor abnormality alarm. Furthermore, the processing goes to step S106 to output a signal to the yaw rate sensor switching unit 7, outputs an alternative yaw rate value estimated by the member other than the yaw rate sensor 2 and then goes out of the program.

On the other hand, if it is judged in step S103 that the vehicle is not in the straight going state, the processing goes to step S107 to judge whether the vehicle is in the steady turn state. If it is judged on the basis of the judgment result of S107 that the vehicle is in the steady turn state, the processing goes to step S108 to calculate the yaw rate γ from the equation (10) on the basis of the force values Ffly, Fflz, Ffry, Ffrz, Frly, Frlz, Frry, Frrz of each wheel.

Subsequently, the processing goes to step S109 to subtract the yaw rate γs detected by the yaw rate sensor 2 from the yaw rate γ calculated in step S108 (γ-γs), and it is judged whether the absolute value is substantially equal to zero, that is, it is not more than the preset value ε1 (for example, 0.005 deg/sec). As a result, in the case of |γ-γs|≦ε1, the yaw rate sensor is regarded as being normal, and the processing directly goes out of the program. In the case of |γ-γs|>ε1, the yaw rate sensor 2 is judged as being abnormal, and the processing goes to S105 to turn on the alarm lamp 6, thereby carrying out the sensor abnormality alarm. Furthermore, the processing goes to step S106 to output a signal to the yaw rate sensor switching portion 7 and output an alternative yaw rate value estimated by the member other than the yaw rate sensor 2, and then goes out of the program.

Furthermore, if it is judged in step S107 that the vehicle is not in the steady turn state, the processing goes to step S110, and the yaw moment Mz(t) acting on the vehicle is calculated from the equation (1). Then, the processing goes to step S111 to calculate the yaw moment Ms(t) acting on the vehicle from the equation (11) on the basis of the yaw rate γs from the yaw rate sensor 2.

Subsequently, the processing goes to step S112 to calculate the correlation coefficient r between the yaw moment Mz (t) and the yaw moment Ms (t) from the equation (12), and then goes to step S113 to judge the correlation coefficient r. As a result of the correlation coefficient, it is judged that the correlation coefficient r is not more than rc (for example, 0.8), it is judged that there is no correlation between the yaw moment Mz (t) and the yaw moment Ms (t) and thus the yaw rate sensor 2 is abnormal, and the processing goes to step S105 to turn on the alarm lamp 6, thereby carrying out the sensor abnormality alarm. Furthermore, the processing goes to step S106 to output a signal to the yaw rate sensor switching unit 7 and output an alternative yaw rate value estimated by the member other than the yaw rate sensor 2 as described above, and then goes out of the program.

Conversely, when the correlation coefficient r is judged as being larger than rc, it is judged that there is strong correlation between the yaw moment Mz (t) and the yaw moment Ms (t) and thus the yaw rate sensor 2 is regarded as being normal, and the processing directly goes out of the program.

As described above, according to this embodiment of the invention, even though the vehicle is in any motion, the output of the yaw rate sensor 2 is monitored and the abnormality can be detected. Therefore, the abnormality of the yaw rate sensor 2 can be immediately and surely detected.

Furthermore, when the vehicle is in the non-steady turn state, the comparison judgment is carried out between the yaw moments represented by the components achieved by differentiating the yaw rate, and thus it is avoided that the yaw moments are forcedly returned to the yaw rate values by integration. Therefore, an accumulated error or the like occurring through the integration calculation is not contained in the judgment result and thus an accurate judgment is carried out.

Furthermore, when the vehicle is in the non-steady turn state, abnormality detection is carried out by estimating the correlation coefficient between the yaw moments represented by the components achieved by differentiating the yaw rate, and thus even when the yaw inertia moment I of the vehicle is varied, the judgment can be performed with high precision, and the estimation can be carried out on a real-time basis.

Furthermore, when abnormality of the yaw rate sensor 2 is detected, the value of another yaw rate is output from the yaw rate sensor switching unit 7, and thus the control is prevented from being intermitted.

What is claimed is:

1. A yaw rate sensor failure detecting device comprising:
   a yaw rate sensor for detecting a yaw rate;
   a tire force detecting unit for detecting tire force acting on each wheel;
   a vehicle motion state judging unit for judging a steady turn state and a non-steady turn state on the basis of the tire force acting on each wheel;
   a yaw rate comparing and abnormality judging unit for comparing a yaw rate value from the yaw rate sensor with a yaw rate value calculated on the basis of the value of the tire force acting on each wheel when the vehicle is in the steady turn state and judging abnormality of the yaw rate sensor; and
   a yaw moment comparing and abnormality judging unit for comparing a yaw moment value calculated from the yaw rate value from the yaw rate sensor with a yaw moment value calculated on the basis of the value of the tire force acting on each wheel when the vehicle is in the non-steady turn state and judging abnormality of the yaw rate sensor.

2. The yaw rate sensor failure diagnosing device according to claim 1, wherein the vehicle motion state judging unit judges a straight going state of the vehicle on the basis of the tire force acting on each wheel, and the yaw rate comparing and abnormality judging unit compares a yaw rate value from the yaw rate sensor with a preset value when the vehicle in the straight going state, and judges abnormality of the yaw rate sensor on the basis of the comparison result.

3. The yaw rate sensor failure diagnosing device according to claim 1, wherein the vehicle motion state judging unit judges the straight going state when the total of the lateral forces of the right and left wheels is smaller than a preset value, judges the steady turn state when no yaw moment occurs in the vehicle and it is regarded that no longitudinal force occurs and also the total of the lateral forces of each wheel exceeds the preset value, and judges as the non-steady turn state the state that the yaw moment occurs in the vehicle.

4. The yaw rate sensor failure diagnosing device according to claim 1, wherein the yaw moment comparing and abnormality judging unit calculates the correlation between the yaw moment value calculated from the yaw rate from the yaw rate sensor and the yaw moment value calculated on the basis of the value of the tire force acting on each wheel from the yaw moment values, when the vehicle is in the non-steady turn state and judging abnormality of the yaw rate sensor in accordance with the value of the correlation coefficient.

5. A yaw rate sensor failure diagnosing device comprising:
   a yaw rate sensor for detecting a yaw rate;
   a tire force detecting unit for detecting tire force acting on each wheel of the vehicle;
   a vehicle motion state judging unit for judging a non-steady turn state of the vehicle on the basis of the tire force acting on each wheel; and
   a yaw moment comparing and abnormality judging unit for comparing a yaw moment value calculated from a yaw rate value from the yaw rate sensor with a yaw moment value calculated from the value of the tire force acting on each wheel when the vehicle is in the non-steady turn state, and judging abnormality of the yaw rate sensor.

6. The yaw rate sensor failure diagnosing device according to claim 5, wherein the yaw moment comparing and abnormality judging unit calculates the correlation coefficient between the yaw moment value calculated from the yaw rate value from the yaw rate sensor and the yaw moment value calculated on the basis of the value of the force acting on each wheel when the vehicle is in the non-steady turn state, and judges abnormality of the yaw rate sensor in accordance with the value of the correlation coefficient.

* * * * *